Nov. 18, 1924.   1,515,609
J. NORTHROP
TEMPLE THREAD CUTTER FOR LOOMS
Filed Dec. 8, 1921
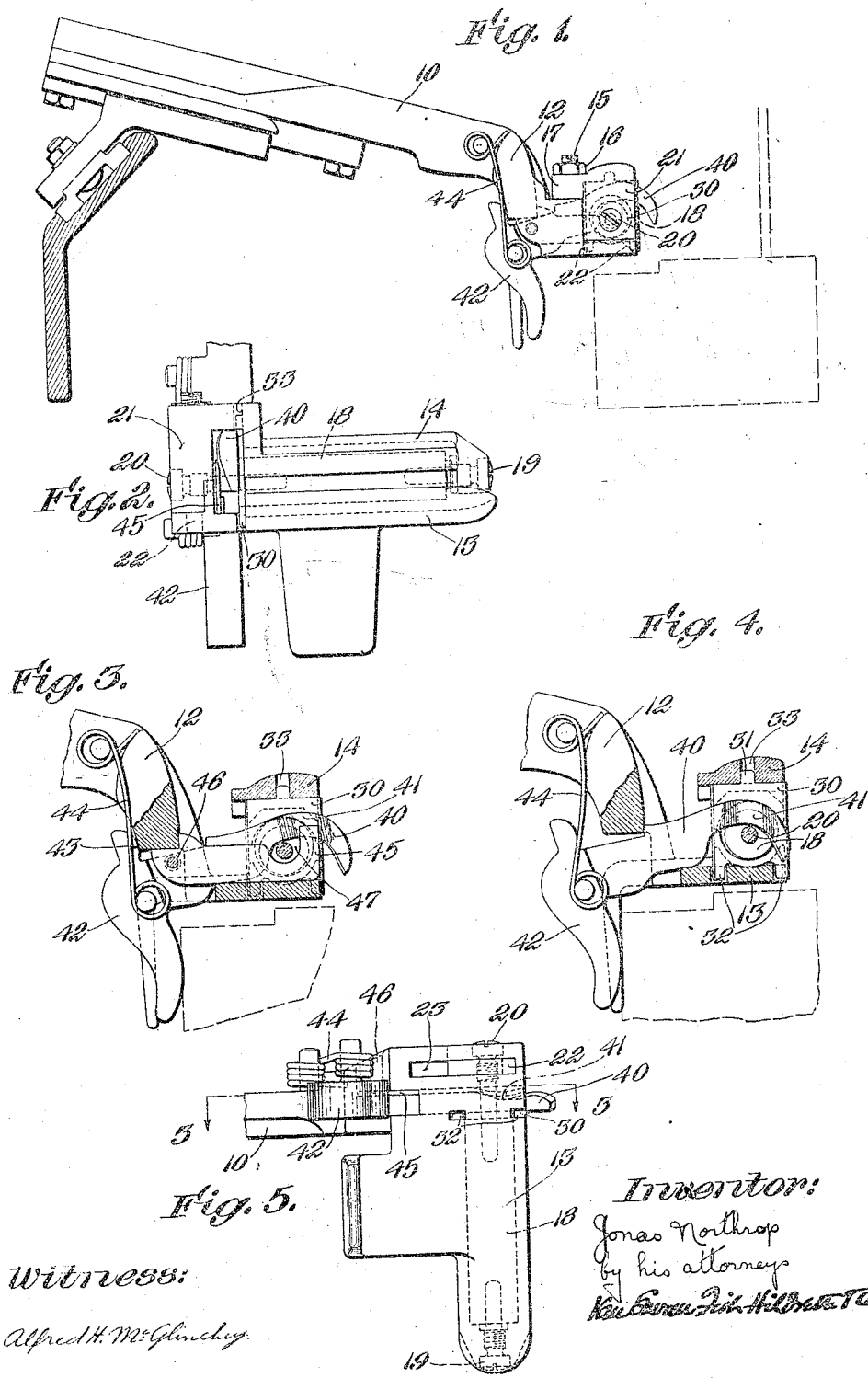
Witness:
Alfred H. McGlinchey.
Inventor:
Jonas Northrop
by his attorneys Patented Nov. 18, 1924.

1,515,609

UNITED STATES PATENT OFFICE.

JONAS NORTHROP, OF HOPEDALE, MASSACHUSETTS, ASSIGNOR TO HOPEDALE MANUFACTURING COMPANY, OF MILFORD, MASSACHUSETTS, A CORPORATION OF MASSACHUSETTS.

TEMPLE THREAD CUTTER FOR LOOMS.

Application filed December 8, 1921. Serial No. 520,883.

*To all whom it may concern:*

Be it known that I, JONAS NORTHROP, a citizen of the United States, residing at Hopedale, in the county of Worcester and State of Massachusetts, have invented certain new and useful Improvements in Temple Thread Cutters for Looms; and I do hereby declare the following to be a full, clear, and exact description of the invention, such as will enable others skilled in the art to which it appertains to make and use the same.

The present invention relates to an improvement in temple thread cutters for looms.

The object of the present invention is to re-organize and improve temple thread cutters for the purpose of increasing their efficiency as cutting implements, reducing the distance of the cut from the selvage, and lowering the cost of the instrument and its maintenance. To the above ends the present invention consists in the temple thread cutter hereinafter described and particularly defined in the claims.

In the accompanying drawings illustrating the preferred form of this invention, Fig. 1 is a side elevation of a temple provided with the thread cutter of the present invention; Fig. 2 is a rear elevation of the same; Fig. 3 is a transverse section of the temple taken on the line 3—3, Fig. 5; Fig. 4 is a similar section showing the cutter in a different position; and Fig. 5 is a bottom plan.

The illustrated embodiment of the invention is described as follows: The temple rod 10 is provided with the usual goose-neck 12 which supports the temple proper, having a pod 13 and a cap 14. The cap is secured to the pod by a screw 15 and a nut 16, fastened through a hole in the ear 17 of the pod. The cap carries the temple roll 18 which is supported in the cap by means of a screw 19 at the outer end and a screw 20 at the inner end. As seen in Fig. 1, the boss 21 supporting the inner end of the temple roll rests upon a surface of the pod. This boss 21 is provided with a tongue 22, which, as shown in Fig. 1 in dotted lines, enters an elongated hole or slot 23 in the bottom of the pod, adapted to receive it. The rear end of the boss 21 is bevelled, and engages a corresponding surface at the end of the slot 23 of the pod. This tongue 22 affords a means additional to the ear and nut for holding the cap and the temple roll carried by it in correct position with relation to the pod. The tongue 22 and slot 23 constitute in effect a mortise and tenon connection between the pod and cap. The temple roll is of the usual form. Its inner end enters a hole provided in the stationary knife 30 so as to bring the temple roll close up to the cutting point. The stationary knife 30 is a flat piece of steel provided with one upwardly extended lug 31, and two downwardly extended lugs 32. The upwardly extended lug 31 is received in a flat hole 33 in the cap, and the two downwardly extended lugs 32 are received in two flat holes formed in the pod. When the cap is in position on the pod and secured thereto by the screw 15 and nut 16, the stationary knife 30 is securely held in position between the two parts. The movable knife 40 is made of cast iron, and, as shown in Fig. 5, is of substantial proportions. The knife is of substantially uniform thickness except for the depression in its side, shown at 41, and except for the heel 42 which is made about twice as thick as the blade of the knife. When the heel of the knife is struck by the lay, the knife first rolls on the fulcrum 43, which engages the back of the goose-neck 12, thereby swinging the knife down into the position shown in Fig. 3, after which further movement of the lay causes the knife to move forwardly, and thereby causes its blade to cut the thread lying between its overhanging hooked end and the edge of the stationary cutter blade 30. The knife is normally held in raised rearward position by means of the spring 44. The movable knife 40 is pressed against the stationary knife 30 by the knife spring 45, which consists of a piece of steel riveted to the goose-neck by the rivet 46, and having its free end extended rearwardly alongside of the knife blade. The end of the knife spring 45 is provided with a depression or recess 47, which extends under the screw 20. The spring is bent, as shown in Fig. 5, and the bent end of the spring normally rests in the recess 41 of the knife. When, however, the knife is moved forwardly to make its cutting stroke, its thicker end engages the bent portion of the spring, and is thereby pressed against the edge of the stationary knife blade to cause it to cut the thread. It will be observed that the stationary knife is symmetrical about a vertical axis, and that its vertical edges are beveled slightly (see Fig. 5). This is for the purpose of giving it two scissors edges, one of which may be turned around and put in the other way, and the other edge used, thereby doubling its life. The passage of the movable blade over the edge of the stationary blade tends to keep it sharp, and besides, the knife may be easily removed and sharpened.

It will be observed that the cap may be removed, and with it comes the stationary knife blade and temple roll. In such condition the movable blade may be removed and replaced, or the temple roll may be removed and replaced, and the stationary knife may be turned over, sharpened, removed or replaced, as may be desired. There is no impediment to the removal of the movable knife at such time, all that is necessary being to slip the loop on the end of the spring 43 off of the ear or the lug on the side of the knife blade, and pull the knife out of the goose-neck of the pod. It will also be noted that the movable knife blade does not need to be sharp in order that it shall be capable of cutting the thread against the stationary knife blade. The movable knife blade being made of cast iron is cheap, and satisfactory in operation, and if broken or required to be renewed, is easily replaced. The stationary knife blade is of simple construction, easily sharpened on an oil stone, and is securely and efficiently held in position when the cap is secured to the pod.

In weaving cloth with an automatic filling replenishing loom of the feeler type, at the end of each bobbin the filling extends outward from the selvage a distance measured by the distance of the cut made by the temple. Heretofore such filling end projected from the selvage has never been reduced below approximately $\frac{7}{8}$ to $\frac{1}{2}$ an inch in length. These threads occur on the selvage in regular weaving with a well exhausted bobbin at intervals which, with moderate widths of cloth, would be perhaps 30 inches apart. It has been the practice in some mills to burn off these loose ends, and in others to trim them by hand with scissors. In any event, their appearance is unsightly if not removed, and their removal is expensive, if that be undertaken.

According to the present invention the distance of the selvage from the cut is only the thickness of the stationary knife blade 50. This is so short in actual practice that the end is not sufficiently conspicuous to be objectionable, or to require removal by burning or special cutting by hand. I am the first, so far as I am aware, to cut the filling substantially at the selvage.

Having thus described the invention, what is claimed is:

1. A temple thread cutter for looms having, in combination, a pod, a cap, a temple roll, a stationary knife having a lug adapted to be received in the cap and a lug adapted to be received in the pod, a movable knife supported in position to cooperate with the stationary knife in cutting the thread, and a spring for holding the movable knife in engagement with the stationary knife.

2. A temple thread cutter for looms having, in combination, a pod, a temple roll, a cap, a reversible stationary cutter having two cutting edges on opposite sides, and means for supporting the stationary cutter between the cap and pod, and a removable cutter for cutting the thread against the stationary cutter.

3. A temple thread cutter for looms having, in combination, a pod, a cap, a temple roll, a stationary cutter supported between the pod and the cap near the inner end of the temple roll, a movable knife having a thread engaging portion adapted to co-operate with the edge of the stationary cutter blade to cut the thread, and a spring secured to the pod for engaging the movable cutter and pressing it against the stationary cutter.

4. A temple thread cutter for looms having, in combination, a pod provided with a mortise, a cap provided with a tenon adapted to be received in the mortise, means for clamping the cap on the pod, a temple roll, a stationary knife supported between the cap and the pod, a movable knife supported in the pod, and a spring for pressing the movable knife against the stationary knife.

5. A temple thread cutter for looms having, in combination, a pod, a cap, means for securing the cap on the pod, a temple roll, a stationary knife held between the pod and cap, a movable knife for engaging the stationary knife to sever the thread, a spring arranged substantially longitudinally of the movable knife for pressing the movable knife against the stationary knife, and means for increasing the pressure of engagement between the movable and stationary knives as the movable knife is actuated to sever the thread.

6. A temple thread cutter for looms having, in combination, a pod, a cap, a temple roll, a stationary knife, a movable knife provided with a recess and a spring having a bent portion normally engaging the recess and adapted to increase the pressure of the movable knife against the stationary knife as the movable knife is actuated to sever the thread.

7. A temple thread cutter for looms having, in combination, a pod, a cap, a temple roll, a stationary knife, one side of which forms a guide to keep the cloth on the roll, a movable knife adapted to engage the other side of the stationary knife to sever the thread, the movable knife being provided with a recess, and a spring having a portion normally engaging the recess to cause the pressure of engagement between the movable and stationary knives to increase as the movable knife is actuated.

JONAS NORTHROP.